United States Patent
Yount et al.

(10) Patent No.: US 6,561,463 B1
(45) Date of Patent: *May 13, 2003

(54) FLIGHT CONTROL MODULE WITH INTEGRATED SPOILER ACTUATOR CONTROL ELECTRONICS

(75) Inventors: Larry Yount, Scottsdale, AZ (US); John Todd, Glendale, AZ (US)

(73) Assignee: Honeywell International Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/616,195

(22) Filed: Jul. 14, 2000

(51) Int. Cl.[7] .............................................. B64C 13/00
(52) U.S. Cl. ....................................... 244/196; 244/221
(58) Field of Search ............................. 244/90 A, 196, 244/197, 225, 227, 228, 193, 90 R, 113, 110 D, 75 R, 213, 220, 221

(56) References Cited

U.S. PATENT DOCUMENTS

| | | | |
|---|---|---|---|
| 3,945,593 A | * 3/1976 | Schanzer | ...................... 244/77 |
| 4,087,065 A | 5/1978 | Arnquist | |
| 4,272,046 A | 6/1981 | Trick | |
| 4,363,098 A | * 12/1982 | Buus et al. | .................. 364/434 |
| 4,472,780 A | * 9/1984 | Chenoweth et al. | ........ 364/434 |
| 4,567,813 A | 2/1986 | Garnjost | |
| 4,807,516 A | * 2/1989 | Takats | ....................... 91/363 A |
| 4,887,214 A | 12/1989 | Takats et al. | |
| 5,036,469 A | 7/1991 | Pelton | |
| 5,374,014 A | 12/1994 | Traverse et al. | |
| 5,493,497 A | * 2/1996 | Buus | ........................... 364/434 |
| 5,670,856 A | 9/1997 | Le et al. | |
| 5,714,948 A | * 2/1998 | Farmakis et al. | ............ 340/961 |
| 5,806,805 A | 9/1998 | Elbert et al. | |
| 6,070,829 A | 6/2000 | Bellera | |

FOREIGN PATENT DOCUMENTS

| | | | |
|---|---|---|---|
| EP | 0573106 A | 12/1993 | |
| FR | 2557854 | * 1/1948 | ................. 244/221 |

OTHER PUBLICATIONS

US Space Shuttle Avionics Systems, http://www.fas.org/spp/civil/sts/newsref/sts–av.html.*

Todd, Jr et al: "Integrating Fly–by–light/Power–by–wire Flight Control Systems on Transport Aircraft," Digital Avionics Systems Conference, 1993. 12th DASC., AIAA/IEEE Fort Worth, TX, USA Oct. 25–28, 1993, New York, NY, USA, IEEE, US, Oct. 25, 1993, pp. 457–462, XP010117028, ISBN: 0–7803–1343–7, p. 459; p. 460; last paragraph—p. 461.

Todd, Jr et al: "Digital Flight Control Systems: Some New Commercial Twists," Proceedings of the 10th AIAA/IEEE Digital Avionics System Conference, 1991, pp. 79–84, XP010093674, tables 2, 3.

* cited by examiner

Primary Examiner—Peter M. Poon
Assistant Examiner—Timothy D. Collins

(57) ABSTRACT

A flight control module with integrated actuator spoiler control electronics, where the flight control functions have been integrated into the integrated modular avionics through the use of a flight control module ("FCM"), the FCM being configured to contain spoiler actuator control electronics ("ACE"). The spoiler ACE is used to control the roll functions of the spoiler. The spoiler ACE is configured to be separate from the FCM, even though it is located within the same modules and receives its power independent of the power supply for the FCM. In the event of a failure of the primary flight control surfaces of an airplane, the spoilers can be used to control the roll of the aircraft because the spoiler ACE is independent of the ACE used to control the primary flight control surfaces. The spoiler ACE can also be used in the event of a failure of the FCM because the spoiler ACE is independent of the FCM.

11 Claims, 3 Drawing Sheets

FLIGHT CONTROL MODULE WITH INTEGRATED SPOILER ACTUATOR CONTROL ELECTRONICS

BACKGROUND OF THE INVENTION

1. Technical Field

The present invention relates to aircraft electronics, and more particularly to a flight control module with integrated spoiler actuator electronics.

2. Background Information

Referring to FIG. 1, a typical airplane includes fuselage 110, which holds the passengers and the cargo; wings 112, which provide the lift needed to fly the airplane; vertical stabilizers 114 and horizontal stabilizers 116, which are used to ensure a stable flight; and engines 118, which provide the thrust needed to propel the airplane forward.

To guide an airplane, one must rely on flight control surfaces that are placed on wings 112, vertical stabilizers 114, and horizontal stabilizers 116. The primary flight control surfaces on an airplane include the ailerons 100, the elevators 102, and the rudder 104. Ailerons 100 are located on the trailing edges of the wings of the airplane and control the roll of the airplane. Rolling of an airplane is depicted in FIG. 2A. Elevators 102 are located on the horizontal stabilizer of an airplane and control the pitch of the airplane. Pitching of an airplane is depicted in FIG. 2B. Rudder 104 is located on the vertical stabilizer and controls the yaw of the airplane. Yawing of an airplane is illustrated in FIG. 2C.

Also present on the wings of an airplane are spoilers 106, flaps 120, and slats 122, collectively known as secondary flight control surfaces. Spoilers 106 are located on the wings and perform a variety of different functions, including assisting in the control of vertical flight path, acting as air brakes to control the forward speed of the airplane, and acting as ground spoilers to reduce wing lift to help maintain contact between the landing gear and the runway when braking.

Flaps 120 and slats 122 are located on the wings of an airplane to change the lift and drag forces effecting an airplane, with flaps 120 at the trailing edge of wing 112 and slats 122 at the leading edge wing 112. When flaps 120 and slats 122 are extended, the shape of the wing changes to provide more lift. With an increased lift, the airplane is able to fly at lower speeds, thus simplifying both the landing procedure and the take-off procedure.

The primary flight control surfaces described above are operated by a pilot located in the cockpit of the airplane. Rudder 104 is typically controlled by a pair of rudder pedals operated by the pilot's feet. Ailerons 100 are controlled by adjusting a control stick to the left or right. Moving the control stick to the left typically controls the left aileron to rise and the right aileron to go down, causing the airplane to roll to the left. Elevator 102 is controlled by adjusting a control stick to the front or back. Spoilers 106 are typically operated by a separate control stick.

In most smaller airplanes, there is a direct mechanical linkage between the pilot's controls and the moveable surfaces. In most larger airplanes, there may be cables or wires connecting the pilot's controls to the hydraulic actuators used to move the primary control surfaces. In newer planes, a system called "fly-by-wire" has been developed.

In a typical, prior art, fly-by-wire airplane, electronic sensors are attached to the pilot's controls. These sensors transmit electronic data to various flight control computers ("FCC"). A system known as the actuator control electronics ("ACE") receives the electronic signals from the flight control computer and move hydraulic actuators based on the received signals. Each hydraulic actuator is coupled to a moveable surface such that movement of the actuator moves the primary control surface.

The fly-by-wire concept results in a savings of weight as there is no longer a need for heavy linkages, cables, pulleys, and brackets running throughout the airplane to control the actuators, only electrical wiring to the FCC and the ACE. Furthermore, this concept may result in a smoother flight, with less effort needed by the pilot.

Although fly-by-wire systems have proven to be very reliable in the past a secondary backup system may be desirable. In the prior art, a mechanical backup has been used. For example, the Boeing 777 airplane uses a cable-driven spoiler on each wing and a hydraulically controlled trim system on the horizontal stabilizer to control the airplane in the event of a failure of the primary flight control surfaces. The present invention eliminates the need for a mechanical backup.

SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention concerns a spoiler actuator control electronics unit ("spoiler ACE") located within a flight control module. In one embodiment of the invention, the spoiler ACE is electrically separate from the Flight Control Module ("FCM"), having an independent power supply and separate input and output ports. The spoiler ACE receives input from a pilot's control stick and translates the input into electrical signals that control the movements of hydraulic actuators which move the spoilers.

The spoiler ACE also can have a mode of operation in which augmentation signals are transmitted by the FCM. These augmentation signals can be limited by limiters and interlocks such that the FCM does not transmit potentially dangerous signals to the hydraulic actuators.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only, because various changes and modifications within the spirit and scope of the invention will become apparent to those of skill in the art from the detailed description of the invention and claims that follow.

BRIEF DESCRIPTION OF THE DRAWINGS

The invention is further described in connection with the accompanying drawings, in which.

DETAILED DESCRIPTION OF THE INVENTION

Figure 1:
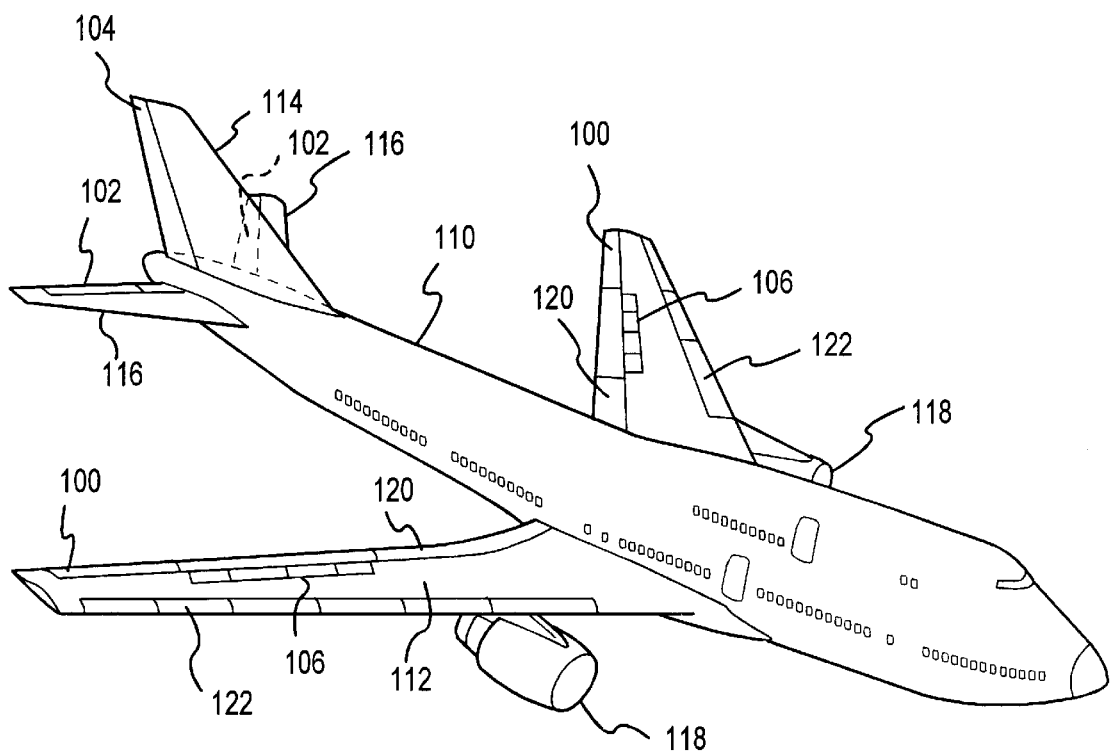
FIG. 1 shows an exemplary airplane in a perspective view.
Figure 2A:
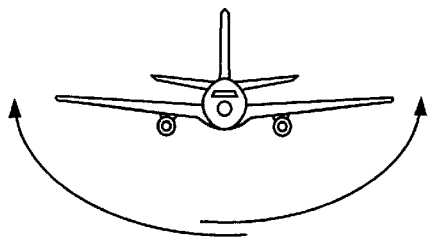
FIGS. 2A, 2B, and 2C show the three axes about which an airplane can be controlled.
Figure 2B:
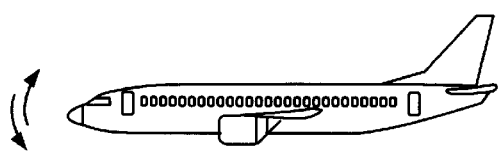
Figure 2C:
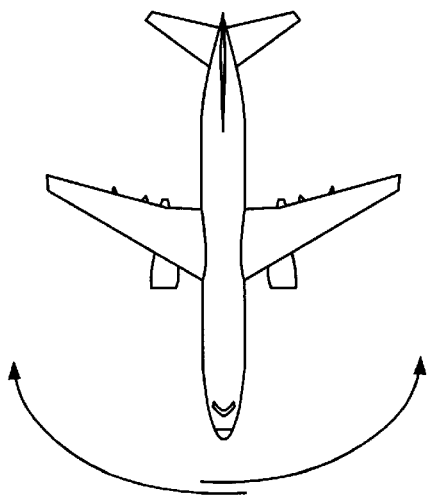

As-explained in co-pending application entitled "Flight Control Module Merged Into Integrated Modular Avionics," filed Jul. 14, 2000 as Ser. No. 09/616,196 ("FCM/IMA application"), the contents of which are incorporated by reference, a flight control module ("FCM") is coupled with the integrated modular avionics ("IMA") unit of a modern fly-by-wire airplane. The IMA unit includes a backplane into which various modules are inserted. For example, there may be a module that supplies power to the IMA backplane, processor units, and input/output units. When a module is inserted into the IMA, a connector at the back of the module connects with the backplane. This connection supplies power to the module and also allows the, transfer of information from the backplane to the module.

Among the functions controlled by the IMA are flight management, displays, navigation, central maintenance, airplane condition monitoring, flight deck communications, thrust management, digital flight data, engine data interface, and data conversion.

As explained in the above-referenced patent disclosure, the primary control surfaces of an airplane can be controlled by a primary ACE with various forms augmentation being performed by the FCM. When the FCM is operating, the primary ACE receives augmentation information from the FCM. However, in the event of the FCM's failure, the pilot maintains control over the primary control surfaces via a "direct mode" in which the ACE controls the primary control surface based solely on the pilot's input. This "direct mode" is sufficient to control the airplane. The direct mode of the ACE provides a backup, in effect, to the FCM augmented behavior of the ACE.

There is, however, a desire to provide an additional layer of backup, even though not required by the regulations. Therefore, the FCM also contains Actuator Control Electronics ("ACE") for spoilers 106, called the spoiler ACE.

Spoilers may have several different functions. For example, certain spoilers act as speed brakes while in the air, to slow the airplane. Certain spoilers also act as ground spoilers to help the brakes on the landing gear operate after landing. In addition to acting as speed brakes and ground spoilers, certain spoilers can also provide assistance to the ailerons to provide roll control at low air speeds. Spoilers acting in this manner are termed "roll control spoilers." At low airspeeds, the ailerons lack sufficient authority to roll the airplane alone. Once the ailerons on one wing are raised to a certain extent, the spoilers of that wing are raised to provide additional roll capability to the airplane. It should be noted a spoiler may perform any combination of the three functions described above.

Because of the roll control capability of the spoilers, they can be used as a backup to the ailerons, used when the pilot has no control over the ailerons. Prior art airplanes with fly-by-wire systems operated the spoilers using the same system used to operate the primary used cables to operate the spoilers as a backup to the ailerons. In the event of a failure of the ailerons, the pilot still had a separate control mechanically linked to the spoilers. This mechanical linkage was independent of the system used to control the ailerons. The present invention uses a separate fly-by-wire system to move the spoilers.

The operation of the system used to control the primary flight control surfaces is more fully described in FCM/IMA application. Briefly, a primary ACE receives input directly from the pilot. This input is augmented by instructions from the FCM, which generally smoothes the response of the airplane. The spoilers are operated in a similar, but not identical, manner.

The spoilers are operated through the use of hydraulic actuators electrically coupled to actuator control electronics for the spoiler (the "spoiler ACE"). The hydraulic actuators are mechanically coupled to the spoilers such that movement of the hydraulic actuators moves the spoiler to which it is coupled. However, while the primary control surface is controlled by an ACE that is in a separate area of the airplane from the FCM, the spoiler ACE is physically located within the FCM. However, the spoiler ACE is electrically independent of the FCM.

Figure 3:
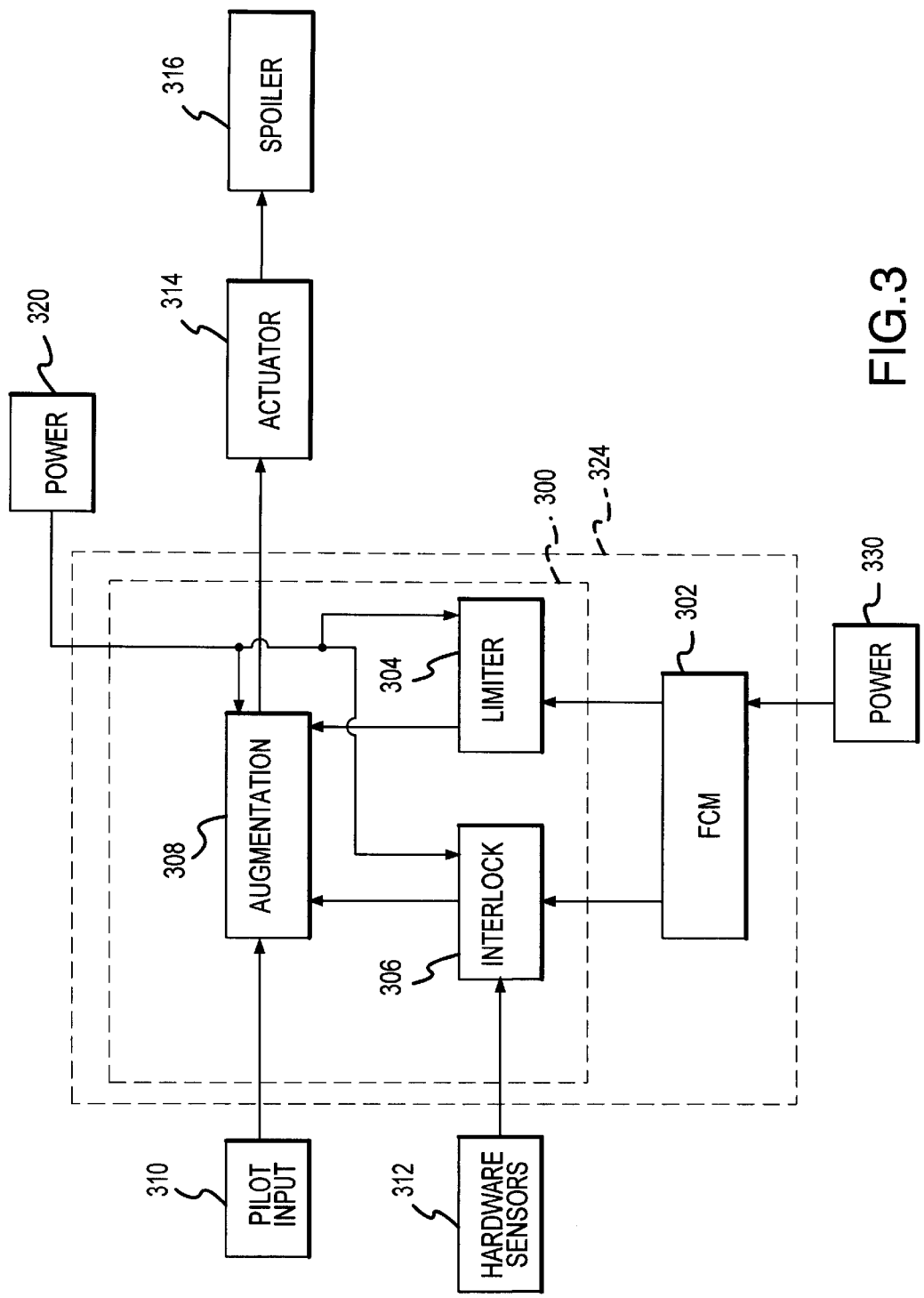
FIG. 3 depicts an embodiment of the present invention integrated modular avionics unit in block diagram format.

A block diagram of the connections of the spoiler ACE for one roll control spoiler is shown in FIG. 3. It should be noted that a typical airplane has at least two roll control spoilers, one on each wing, and there is a spoiler ACE for each roll control spoiler. In addition, there may be ground spoilers or speed brake spoilers that do not perform a roll control function. Each of those spoilers is also controlled by a spoiler ACE.

Spoiler ACE 300 operates similarly to the primary ACE in that pilot input 310, through the spoiler control stick, is augmented by instructions from FCM 302. Augmentation unit 308 includes a summer which sums the signals from pilot input 310 with the signals from limiter 304 and interlock 306. The signal is transmitted to hydraulic actuator 314, external to the spoiler ACE, which is physically coupled to spoiler 316 such that a movement of hydraulic actuator 314 moves spoiler 316 in a predetermined direction. Limiter 304 and interlock 306 are used to prevent erroneous signals from the FCM from being transmitted to hydraulic actuators 314.

Power supply 320 supplies power to spoiler ACE 300. As explained above, the IMA contains a power module that distributes power, through the backplane of the IMA, to all of the modules present in the IMA, including the FCM. However, although spoiler ACE 300 is physically located within FCM 302, spoiler ACE 300 is electrically separate from FCM 302. Therefore, while the FCM receives power and input/output data from the backplane of the IMA, spoiler ACE 300 is powered through a separate connection on the front of the module. Spoiler ACE 300 also receives inputs from the pilot and distributes outputs to hydraulic actuator 314 through a connection on the front of the module. Therefore, if the IMA power supply fails or even if FCM 302 is physically pulled from the IMA housing or cabinet, the spoiler ACE is still powered and still communicates with the actuators. If the FCM is unpowered, then the spoiler ACE receives no augmentation from the FCM and the spoiler operates in the direct mode. Thus, the spoiler ACE remains operational in the event of an FCM failure or an IMA failure.

The location of spoiler ACE 300 within FCM 302 facilitates the communication between FCM 302 and spoiler ACE 300. The FCM communicates with the primary ACE over a standardized ARINC 629 bus. If spoiler ACE 300 is to act as a backup to the primary ACE, it must operate in the event of a failure of the primary ACE. While there may be several causes of a failure of the primary ACE, one cause may be the failure of the ARINC 629 bus linking the FCM with the primary ACE. By placing spoiler ACE 300 physically within FCM 302, the two systems are able to communicate even in the event of a failure to the ARINC 629 bus. Furthermore, the two systems are able to communicate at a much faster rate, as the ARINC 629 bus has a smaller bandwidth than the internal communications channel.

The roll control provided by the spoilers is controlled in the analog portion of spoiler ACE 300, with augmentation provided by FCM 302. By placing the roll control in the analog portion, the airplane is protected against the spoilers on both sets of wings being deployed at one time because the likelihood of both analog portions having the same error at the same time is very minimal.

Limiter 304 is used to limit the effect of FCM 302. If FCM 302 attempts to move spoiler 316 by an amount that is greater than a predetermined amount, limiter 304 can prevent the movement. Limiter 304 is intended to limit the amount of control the IMA, the FCC, the ACE and the pilot can have on the overall flight control system, and thus, the overall operation of the aircraft. Those of skill in the art will realize that the design of the limiter 304 can be implemented in either hardware or software, and either in digital or analog format. An analog limiter is the preferred embodiment as it does not require similar redundancy like a software implementation. Limiter 300 limits, without limitation, limits of rate, limits of gain, limits of airspeed, limits of phase margin limits of roll, limits of yaw, limits of pitch, limits of speed break, limits of column position data and like limits required for safe operation of the aircraft.

Interlock 306 receives various information from hardware sensors 312 to prevent certain operations unless certain conditions are present. For example, the ground spoilers are used after an airplane lands to help the brakes on the landing gear operate by providing down force to the wings. The ground spoiler functions are controlled by the FCM. However, the ground spoilers should not activate when the airplane is flying in the air because the ground spoilers reduce the lift of the wings. Hardware sensors 312 can be coupled to the landing gear to sense when the airplane is on the ground. Interlock 306 contains analog logic that ensures that the ground spoiler will deploy only when the airplane is on the ground.

In the event of the failure of all the primary control surfaces, the spoiler ACE, located in the FCM, can provide rudimentary roll control over the airplane. In conjunction with the limited control over pitch using the trim control of the horizontal stabilizer, the pilot would be able to keep the airplane aloft while solving the problems with the primary flight control surfaces.

There are many benefits that arise from the configuration depicted in FIG. 3. Although the fly-by-wire system described in the FCM/IMA application provides enough safety to satisfy the regulations, the presence of another backup enhances the functionality of the fly-by-wire system, making the system more desirable to airplane manufacturers. Furthermore, the system of FIG. 3 has a relatively low cost compared to the systems of the prior art. The spoiler system is not full-time critical because it is not fully computerized. Thus, there is no need for similar redundancy, and there is no need for two software development teams or two processors. Furthermore, the lack of a mechanical backup for the spoilers results in a weight savings, which allows the airplane to travel farther or carry more passengers.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention, and are not intended to limit the scope of the invention. It is contemplated that the use of the present invention can involve components having different characteristics as long as the principle, the presentation of a method and apparatus for controlling the spoilers of an airplane, is followed.

We claim:

1. A module for insertion into an integrated modular avionics unit for use in an airplane comprising:
   a flight control computer; and
   actuator control electronics coupled to a spoiler; wherein said module is inserted into the integrated modular avionics unit and said flight control computer augments control of the airplane, and wherein said actuator control electronics is configured to operate said spoiler in the event of a failure of said flight control computer to provide backup roll control of said airplane.

2. The module of claim 1 wherein,
   said module further comprises a connector at the rear of said module configured to interface with a backplane located on said integrated modular avionics unit.

3. The module of claim 2, wherein
   said connector is configured to supply power and data to said module.

4. The module of claim 3, wherein
   said module further comprises a power input independent of said connector.

5. The module of claim 4, wherein
   said power input is configured to supply power only to said actuator control electronics.

6. The module of claim 1, wherein
   said flight control computer provides augmentation information to said actuator control electronics.

7. The module of claim 6, wherein
   said actuator control electronics is configured to operate said spoiler through an actuator coupled to said spoiler by sending electrical signals to said actuator.

8. The module of claim 1, wherein
   said actuator control electronics comprises an augmentation unit, an interlock unit, and a limiter;
   wherein both said limiter and said interlock unit are coupled to said augmentation unit;
   said augmentation unit is coupled to input units, external to said module, controlled by a pilot;
   said augmentation unit is coupled to a hydraulic actuator external to said module; and
   said hydraulic actuator is coupled to a spoiler located on a wing of the airplane.

9. The module of claim 8, wherein
   said interlock unit is coupled to at least one hardware sensor; wherein,
   said hardware sensor is configured to indicate when said airplane is on the ground; and
   said interlock unit is configured to prevent certain commands from said flight control computer from being transmitted to said augmentation unit in the event said hardware sensor fails to indicate that said airplane is on the ground.

10. The module of claim 8, wherein
    said limiter is configured to prevent the transmission of signals outside a predetermined range from said flight control computer to said analog augmentation unit.

11. The module of claim 8, wherein
    said augmentation unit comprises an analog summer unit;
    said interlock unit comprises analog electronics; and
    said limiter comprises analog electronics.

* * * * *